Figure 1:
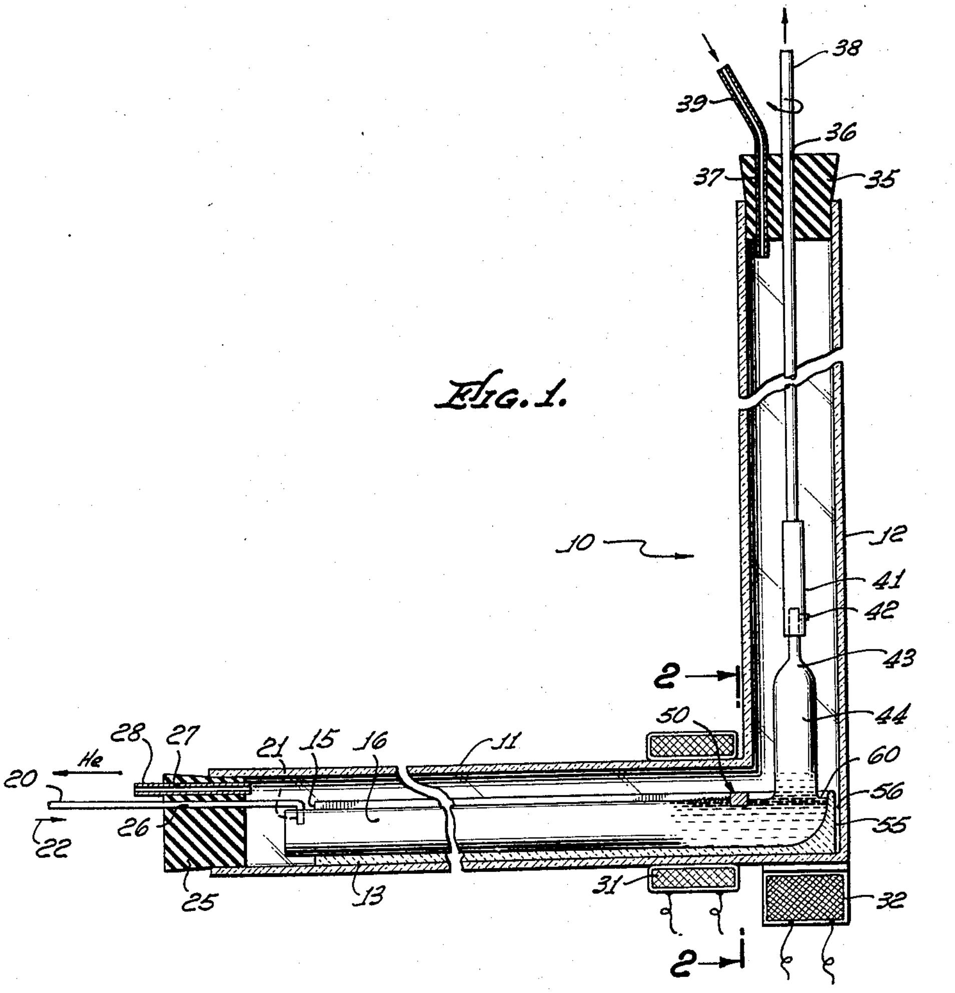

Nov. 29, 1960 S. MARTIN 2,962,363

CRYSTAL PULLING APPARATUS AND METHOD

Filed July 9, 1957

STEPHEN MARTIN,
INVENTOR

By Spensley and Horn

ATTORNEYS.

United States Patent Office 2,962,363

Patented Nov. 29, 1960

2,962,363

CRYSTAL PULLING APPARATUS AND METHOD

Stephen Martin, Culver City, Calif., assignor to Pacific Semiconductors, Inc., Culver City, Calif., a corporation of Delaware Filed July 9, 1957, Ser. No. 670,745

13 Claims. (23—301)

This invention relates to a crystal refining process, and more particularly, to a method of, and apparatus for, producing substantially uniform resistivity crystals of solid, fusible materials.

One particular application of this invention is in the manufacture of semiconductor crystals for use in semiconductor devices such as diodes and transistors. In the manufacture of these semiconductor devices it is necessary to produce crystals of the semiconductor material, which are highly purified, which are free from crystal imperfections, which have a single crystalline structure, and which have a substantially uniform resistivity.

In the semiconductor art, a region of semiconductor material containing an excess of donor impurities and having an excess of free electrons is considered to be an N-type region, while a P-type region is one containing an excess of acceptor impurities resulting in a deficit of electrons, or stated differently, an excess of holes. When a continuous, solid specimen of semiconductor material has an N-type region adjacent a P-type region, the boundary between them is termed a P-N (or N-P) junction, and the specimen of semiconductor material is termed a P-N junction semiconductor device.

The term semiconductor material as utilized herein is considered generic to germanium, silicon, germanium-silicon alloy, as well as indium-arsenide, aluminum arsenide, gallium arsenide, lead sulphide, lead telluride, lead selenide, cadmium sulphite, cadmium telluride and cadmium selenide; and the like.

The term active impurity is used to denote those impurities which affect the electrical characteristics of semiconductor materials as distinguished from other impurities which have no appreciable effect upon these characteristics. Active impurities are ordinarily classified as donor impurities such as phosphorous, arsenic, and antimony or acceptor impurities such as boron, aluminum, gallium, and indium or recombination and trapping site impurities such as nickel.

Present art techniques which achieve the above mentioned criteria are the so-called zone-melting technique as described in United States Patent No. 2,739,088 entitled "Process for Controlling Solute Segregation by Zone-Melting," by W. G. Pfann, issued March 20, 1956, and by the so-called crystal pulling method described by G. K. Teal and J. B. Little, Physical Review, at pages 78 and 647 (1950).

The present art methods each, however, have certain shortcomings. The zone-melting method, while it may be used to produce high purity, single crystals of germanium, for example, of relatively uniform resistivity, often results in a crystal having many structural imperfections such as lineage. The crystal-pulling method, on the other hand, produces single crystals of germanium or silicon of relatively high purity and of good structural perfection, but the resistivity will vary over the length of the crystal.

What is desired is a system which will provide the combined advantages of both the zone-melting and the crystal-pulling methods to produce high purity single crystals of germanium or other semiconductor materials hereinabove referred to which are free from crystal imperfections and which have a substantially uniform resistivity over their entire length.

It is therefore an object of this invention to provide a new and improved method for producing single crystals of high purity, solid fusible material free of crystal imperfections having substantially uniform composition over the length of the crystal.

Another object of this invention is to provide a new and improved method for producing single crystals of high purity, semiconductor material free of crystal imperfections and of substantially uniform resistivity over the length of the crystal.

Yet another object of this invention is to provide a new and improved method for producing single crystals of high purity germanium free of crystal imperfections and of substantially uniform resistivity over the length of the crystal.

Yet another object of this invention is to provide a new and improved method for producing a single crystal of active impurity doped high purity silicon free of crystal imperfections with a substantially uniform resistivity over the length of the crystal.

Yet another object of this invention is to provide an apparatus for producing single crystals of high purity, solid fusible material, free of crystal imperfections and of substantially uniform composition over the length of the crystal.

A further object of this invention is to provide an apparatus for producing a single crystal of high purity germanium, free of crystal imperfections and of substantially uniform resistivity over the length of the crystal.

A still further object of this invention is to provide an apparatus for producing a single crystal of high purity silicon, free of crystal imperfections, and of substantially uniform resistivity over the length of the crystal.

The invention method and apparatus will, for purposes of clarity and simplicity be described in connection with the production of a single crystal of germanium, it being understood that it is equally applicable, with appropriate changes in parameter, as would be obvious to one skilled in the art, to the production of a single crystal of silicon or any other semiconductor material, as well as to the production of other fusible crystalline materials.

In accordance with the presently preferred embodiment of this invention, there is provided an L-shaped furnace. A solid bar of germanium is placed into a crucible which is fed into the horizontal leg of the furnace toward the corner of the L. A heating coil or coils are provided in close proximity to the corner of the L to provide a molten zone therein. A single crystal of germanium, secured at the end of a draw rod is placed into the vertical leg of the furnace to reach into the molten zone. The draw rod is then slowly rotated and withdrawn in accordance with standard drawing techniques from the melt, thus pulling out a continuous single crystal of germanium. The invention process described herein will permit the processing of larger amounts of material than is presently permissible by standard pulling techniques while maintaining a substantially uniform resistivity throughout the length of the withdrawn single crystal.

One prior art apparatus similar to the furnace of this invention is described in "Transistors I," RCA Laboratories, 1956, at pages 66 to 76. The method of the present invention may, however, be distinguished from that described in the above referred to publication. The RCA furnace contemplates a U-shaped furnace with a molten zone being maintained at the bend in the U. Into one leg of the furnace is fed a bar of germanium while the crystal is drawn from the other leg. As will be made clear hereinafter, this prior art furnace has several disadvantages which are overcome by the present invention.

The novel features which are believed to be characteristic of the present invention both as to its organization and method of operation, together with other objects and advantages thereof, will be better understood from the following description considered in connection with the accompanying drawing in which the presently preferred embodiment of the invention is illustrated by way of example. It is to be expressly understood, however, that the drawing is for the purpose of illustration and description only, and is not intended as a definition of the limits of the invention.

Figure 2:
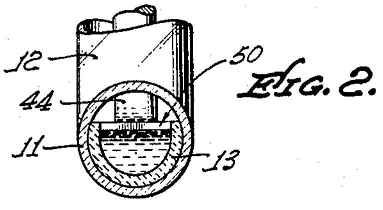

In the drawing:

Figure 1 is a cross-sectional view of the presently preferred embodiment of this invention; and Figure 2 is a view taken along line 2—2 of Figure 1.

Referring now to the drawing, there is shown in Figure 1 an L-shaped furnace 10, made of two quartz tubular legs 11 and 12. While quartz has been found to be particularly satisfactory for the leg material, other high melting point materials such as silicon-nitride, silicon-carbide, molybdenum, tungsten, or any other high melting point material may be used.

A crucible or boat 13, which may be fabricated of graphite, silicon-nitride, or any other similar material, is placed within horizontal leg 11. The crucible must have a smaller outside diameter than the inside diameter of leg 11 of furnace 10. The crucible is provided with an opening at its left end 15, as shown. A bar of germanium 16, is placed within the crucible 13. A push-rod 20, connected to a drive means, not shown, is connected to the left end of the germanium bar 16 by insertion into hole 21 therein to permit advancement of germanium bar 16 in the direction of arrow 22. The open end of leg 11 of furnace 10 is closed by hermetic seal 25, which has two gas-tight seals 26 and 27, provided therein to accommodate push-rod 20 as well as gas outlet tube 28. A first resistance or induction heater 31 is disposed near the corner of the L and around the periphery of the leg 11. This heater is connected to a source of voltage, not shown. At the bottom of leg 11, close to the extreme right hand side thereof, is disposed a second heater 32. Heater 32 may also be either of the resistance or induction type. Additional heaters might also be used.

The tube or vertical leg 12 is sealed from the atmosphere by hermetic seal 35, which has two gas-tight seals 36 and 37 therein, as shown, to accommodate a draw-rod 38 and gas inlet tube 39. Seed holder 41, which has a set screw 42 therein, as shown in Figure 1, is adapted to hold a seed crystal 43.

The operation of the furnace hereinabove described involves the loading of crucible 15 with a continuous bar of germanium or several chunks of germanium 16, together with any doping constituent that may be desired. The amount and manner of doping will hereinafter be described.

The boat or crucible 16, after having been loaded, is placed within leg 11 of furnace 10, as shown in Figure 1. The right end 55 of crucible 13 is brought in close proximity to the inner wall 56 of tube 12. The push-rod 20 is then connected to the rear of the germanium bar through hole 21. With the boat and rod in place, hermetic seal 25 is placed into the left end of leg 11 of furnace 10. The seal 25 has gas outlet tube 28 placed therethrough to maintain connection between the inside of furnace 10 and a gas line, not shown. A single seed crystal of germanium 43 is inserted into seed holder 41 and secured therein by set screw 42. The upper end of leg 12 of the furnace is now sealed from the atmosphere by hermetic seal 35 with gas inlet tube 39 and draw-rod 38 connected therethrough. With the furnace completely sealed, a gas connection is made at gas inlet 39 and gas outlet 28 to a source of gas, not shown.

The seed crystal 43 is lowered into leg 12 to a position within the upper half thereof, by lowering draw-rod 38. With the seed crystal in this position, and with the entire apparatus at room temperature, the furnace is gas-flushed for approximately 15 minutes. The flushing gas used must be free of contaminants and be non-oxidizing. Helium gas is typically used, but other inert or reducing gases are also appropriate.

Following the flushing operation, the furnace is heated by energizing heaters 31 and 32. After the material that is to form the single crystal semiconductor has become molten and stabilized at the deisred temperature, seed 43 is lowered by draw-rod 38 to make contact with the surface of the metal. The temperature of the molten material is maintained critically by judgment of the operator. The molten zone extends approximately ¼ inch to the left of baffle 50 which is shown in Figures 1 and 2.

The molten germanium in contact with the seed and thereafter with the growing crystal gradually solidifies and adds to the crystal as it is raised. Suitably, the draw rate, i.e., rate of withdrawal may be from 0.5 to 6 inches per hour and the temperature at the surface 60 of the melt adjacent the withdrawn crystal 44, should be slightly below the melting point of the germanium so as to be super-cooled at the solid-liquid interface.

While it is not necessary, it may be desired to rotate the crystal 44 as it is being withdrawn. This is usually done if the crystal has a tendency to grow to one side, due to an uneven temperature distribution within the furnace. A typical rotation rate is 10 revolutions per minute.

Baffle 50 is provided to hold back surface impurities such as oxides and graphite. The drawing is continued until the entire melt is consumed.

In one sample run, a 12 inch crystal was pulled from a 12 inch input germanium bar. The diameter of the cylindrical pulled crystal was approximately ¾ of an inch while the feed in germanium bar was approximately 12 inches long and had a cross-section of a hemi-cylinder with a diameter of approximately 1½ inches. Both legs of the furnace were approximately 15 inches in over-all length. The input crystal was a second reduction raw germanium ingot with a resistivity of approximately 30 ohm centimeters. A pellet of a master alloy was used as the active impurity to dope the crystal to N-type conductivity. The master alloy consisted of germanium and antimony with a proportion empirically determined, as may easily be done by one skilled in the art. For example, 200 milligrams of the master alloy produced a 5 ohm centimeter N-type conductivity crystal 12 inches long, ¾ inch diameter single germanium crystal. An approximation as to the relative percentage by weight of germanium to antimony in such a master alloy is 98% to 2%.

Consider for a moment the RCA furnace previously mentioned as contrasted with the furnace of the present invention. In the U-shaped RCA furnace, typically a solid bar of germanium will be inserted within one leg of the furnace while the crystal will be withdrawn from the other leg parallel to the input bar. The molten zone will be maintained at the lower bend of the U. The heat or energy input and dissipation of heat as is required to, on the one hand melt the input bar, and on the other hand freeze out the withdrawn crystal, are of such an order of magnitude that the two zones, i.e., the input melting zone and the output crystallizing zone would have to be separated by approximately 5 inches, should a 1 inch bar be used as an input and a 1 inch diameter crystal be withdrawn. Thus, the bend in the U would have to be approximately 5 inches across. It should, however, be pointed out that a small zone, that is, a small molten zone, could not thus be produced without much difficulty.

A small zone is necessary in order to produce a single crystal of the grown material having substantially uniform resistivity. Another disadvantage inherent in the RCA U-shaped furnace is that it requires a uniform cross-sectional area of the feed-in bar to permit a uniform cross-sectional area of the grown crystal to achieve uniform resistivity thereof. In the L-shaped furnace of the present invention, on the other hand, the cross-section of the melt is inherently uniform as it assumes the shape of the boat itself, as may best be seen in Figure 2. Further, since the molten zone is relatively small in the furnace of the present invention, its temperature can easily be controlled without affecting the temperature of the liquid-solid interface where the crystal is withdrawn and these two zones can be maintained at a close physical separation, as compared to the U-shaped furnace.

While this invention has been described with particular reference to the semi-conductor art, it should be borne in mind, that it is equally applicable to other crystalline materials wherein it is desired to evenly distribute a minor constituent having a small distribution coefficient with respect to the parent crystalline material. The only qualification upon the crystalline material is that it have a small segregation coefficient relative to the impurities to be distributed between its liquid and its solid state.

Further, while this invention has been described with reference to an L-shaped furnace wherein the feed-in leg of the furnace is in the horizontal plane and the withdrawal leg is in the vertical plane, sealing off one end of the horizontal leg, it is equally permissible to have an inverted T-shaped furnace wherein the horizontal leg instead of terminating at one side of the vertical output leg, may extend therebeyond. The boat or crucible would be pulled from one side of the vertical leg to the other through the horizontal leg. It should be pointed out in this alternate embodiment that the entire boat is pushed slowly, with the molten zone being maintained in alignment with the central axis of the vertical leg of the furnace as opposed to the embodiment of Figure 1 wherein the boat remains stationary. There has thus been described a new and novel apparatus for producing single crystals of solid fusible material and method for producing the same.

While the legs of the furnace have been shown as being in the horizontal and vertical planes respectively, it should be pointed out that a slight variation from either plane is permissible. Indeed, it may be found advantageous to slightly tilt the horizontal leg of the furnace down toward the corner to permit of a smoother sliding of the germanium bar as it becomes molten.

What is claimed as new is:

1. An apparatus for producing a single crystal of substantially uniform composition of solid fusible material comprising: a first leg for receiving the material to be produced into a single crystal supported in a substantially horizontal plane; a single second leg sealed to said first leg, said second leg being supported in a substantially vertical plane; a crucible disposed within said first leg having one end thereof extending beyond the intersection of the axes of said first and second legs; means for heating said crucible at a first zone to the melting point of said material, said means for heating being disposed about the periphery of said first leg adjacent its intersection with said second leg; baffle means disposed at the top of said crucible to hold back contaminants on the surface of the melt; means for advancing a mass of said material disposed in said crucible toward said first zone; and means for withdrawing a single crystal of said material from a second zone in said crucible, the temperature at said second zone being maintained just below the freezing point of said material.

2. An apparatus for producing a single crystal of a semiconductor material having a substantially uniform resistivity over the length thereof comprising: a material input leg supported in a substantially horizontal plane; a single second leg sealed to said leg, said material input second leg being supported in a substantially vertical plane; a semi-cylindrically shaped crucible opened at one end and closed at the other end thereof, said crucible being disposed within said material input leg and having the closed end thereof extending beyond the intersection of the axes of said material input and second leg; means for heating said crucible at a first zone to the melting point of said material, said means for heating being disposed about the periphery of said material input leg adjacent its intersection with said second leg; baffle means disposed at the top of said crucible to hold back contaminants on the surface of the melt; and means for withdrawing said material from a second zone in said crucible, said second zone being maintained just below the freezing point of said material.

3. An apparatus for producing a single crystal of germanium containing at least one active impurity and having a substantially uniform resistivity over the length thereof, said apparatus comprising: a first quartz material input tube supported in a substantially horizontal plane; a second quartz crystal withdrawal tube hermetically sealed to one end of said first tube and being supported in a substantially vertical plane whereby said first and second tubes result in an enclosed L-shaped tube; a graphite crucible disposed within said first tube having one end thereof extending beyond the intersection of the axes of said first and second tubes; heating means disposed about the periphery of said first tube adjacent its intersection with said second tube for heating said crucible at a first zone to the melting point of germanium; baffle means disposed at the top of said crucible to hold back contaminants on the surface of the melt; means for advancing a quantity of germanium disposed in said crucible toward said first zone; and means for withdrawing a single crystal of germanium from a second zone in said crucible, the temperature at said second zone being maintained just below the freezing point of germanium.

4. An apparatus for producing a single crystal of silicon containing at least one active impurity and having a substantially uniform resistivity over the length thereof, said apparatus comprising: a first quartz material input tube supported in a substantially horizontal plane; a second quartz material withdrawal tube hermetically sealed to one end of said first tube and being supported in a substantially vertical plane whereby said first and second tubes result in an enclosed L-shaped tube; a crucible disposed within said first tube having one end thereof extending beyond the intersection of the axes of said first and second tubes; heating means disposed about the periphery of said first tube adjacent its intersection with said second tube for heating said crucible at a first zone to the melting point of silicon; baffle means disposed at the top of said crucible to hold back contaminants on the surface of the melt; means for advancing a quantity of silicon disposed in said crucible toward said first zone; and means for withdrawing a single crystal of silicon from a second zone in said crucible, the temperature at said second zone being maintained just below the freezing point of silicon.

5. The method of producing a single crystal of substantially uniform composition from a solid fusible material including the steps of: feeding a quantity of the solid fusible material along a substantially horizontal plane into a molten zone; heating said molten zone to the melting point of said material; vertically disposing a single seed crystal of said material into said zone; substantially vertically withdrawing said seed crystal from said zone thereby to withdraw a larger single crystal of said material therefrom; and continuously feeding said material into said zone to maintain the volume of said molten zone at a predetermined value.

6. The method of producing a single crystal of substantially uniform composition from a solid fusible material including the steps of: feeding the solid fusible material along a substantially horizontal plane into a first zone; heating said first zone to the melting point of said material; vertically disposing a single seed crystal of said material into a second zone adjacent said first zone; heating said second zone to a temperature just below the freezing point of said material; substantially vertically withdrawing said seed crystal from said second zone thereby to withdraw a larger single crystal of said material therefrom; and continuously feeding said material into said first zone to maintain the volume of said second zone at a predetermined value.

7. The method of producing a single crystal of a semiconductor material having a substantially uniform resistivity over the length thereof including the steps of: placing the semiconductor material to be produced into a single crystal, into a substantially horizontally supported substantially semicylindrical shaped crucible open at one end and closed at the other end thereof; disposing said closed end of said crucible into a molten zone, the temperature of said zone being maintained at the melting point of said semiconductor material; vertically disposing a single seed crystal of said semiconductor material into said zone; substantially vertically withdrawing said seed crystal from said zone thereby withdrawing a larger single crystal of said material therefrom; and continuously feeding said material into said zone to maintain the volume of said zone at a predetermined value.

8. The method of producing a single crystal of silicon semiconductor material having a substantially uniform resistivity over the length thereof including the steps of: feeding the silicon material to be produced into a single crystal, into a zone which is at a temperature which will melt said material, said material being fed along a substantially horizontal plane; vertically disposing a single seed crystal of silicon into said zone; and withdrawing a larger single crystal of silicon from said zone by withdrawing said single seed crystal therefrom.

9. The method of producing a single crystal of germanium semiconductor material having a substantially uniform resistivity over the length thereof including the steps of: feeding the germanium material to be produced into a single crystal, along a substantially horizontal plane into a molten zone; heating said molten zone to the melting point of germanium; vertically disposing a single seed crystal of germanium into said zone; substantially vertically withdrawing said seed crystal from said zone thereby to withdraw a larger single crystal of germanium therefrom; and continuously feeding germanium into said zone to maintain the volume of said molten zone at a predetermined value.

10. An apparatus for producing a single crystal of substantially uniform composition of a solid fusible material comprising: a material input leg supported in a substantially horizontal plane; a single second leg for withdrawing the single crystal of said material, said second leg being joined to said material input leg and sealed thereto, said second leg being supported in a substantially vertical plane; means for heating said material input leg to the melting point of said material at a zone contiguous to the intersection of said legs; means for feeding the material to be produced into a single crystal, through said material input leg into said zone; and means for withdrawing a single crystal of said material from said zone, said last named means extending into said second leg.

11. An apparatus for producing a single crystal of substantially uniform composition of a solid fusible material comprising: a material input leg supported in a substantially horizontal plane; a single second leg for withdrawing the single crystal of said material, said second leg being joined to said material input leg, and sealed thereto, said second leg being supported in a substantially vertical plane; a crucible disposed within said material input leg with one end thereof extending beyond the intersection of the axes of the two legs, said crucible being adapted to receive the material to be produced into a single crystal; means for heating the crucible to the melting point of said material at a zone contiguous to said intersection; and means for withdrawing a single crystal of said material from said zone, said last named means extending into said second leg.

12. An apparatus for producing a single crystal of substantially uniform composition of a solid fusible material comprising: a material input leg supported in a substantially horizontal plane; a single second leg for withdrawing the single crystal of said material, said second leg being joined to said material input leg and sealed thereto, said second leg being supported in a substantially vertical plane; a crucible disposed within said material input leg; means for heating said crucible to the melting point of said material at a first zone, said means for heating being disposed about the periphery of said material input leg adjacent its intersection with said second leg; baffle means disposed at the top of the crucible to hold back contaminants at the surface of the melt; and means for withdrawing a single crystal of said material from a second zone in said crucible, the temperature of said second zone being maintained just below the freezing point of said material.

13. Apparatus for producing a single crystal of a semiconductor material having a substantially uniform resistivity throughout the length thereof ,comprising, a substantially horizontally supported open topped elongated crucible adapted to contain said semiconductor material, means to heat a portion of said crucible to a temperature at least equal to the melting point of said material to define a first narrow molten zone of said material in said crucible, said molten material assuming the shape of said portion of said crucible in said first zone, means for withdrawing a single seed grown crystal of said material along an upwardly extending vertical path from a second zone contiguous with and in communication with said first zone in said crucible, means to maintain the temperature of the material in said second zone slightly below said melting point of said material to provide supercooled material in said second zone from which said crystal is pulled, and means for feeding solid semiconductor material in a generally horizontal path in said crucible to said molten zone therein at a rate such as to maintain a total volume of said semiconductor material in said first molten zone and said second supercooled zone at a predetermined value, said horizontal feed path facilitating the use of solid semiconductor stock material of any desired shape and said angle between said feed path and said withdrawal path facilitating the maintenance of said narrow molten zone one side of which is contiguous with the leading edge of said solid semiconductor stock material fed thereto.

References Cited in the file of this patent

UNITED STATES PATENTS

| | | |
|---|---|---|
| 2,739,088 | Pfann | Mar. 20, 1956 |
| 2,747,971 | Hein | May 29, 1956 |
| 2,809,136 | Mortimer | Oct. 8, 1957 |
| 2,893,847 | Schweickert | July 7, 1959 |
| 2,898,249 | Jensen | Aug. 4, 1959 |

OTHER REFERENCES

RCA Lab. "Transistors I," March 1956, pages 66–76, Fig. 3.

Pfann: "Transistor Technology," Part I, chapter 2, Figs. 2–21, July 1953.